US008626573B2

(12) United States Patent
Niheu et al.

(10) Patent No.: US 8,626,573 B2
(45) Date of Patent: *Jan. 7, 2014

(54) SYSTEM AND METHOD OF INTEGRATING ENTERPRISE APPLICATIONS

(75) Inventors: Eric K. Niheu, Newark, CA (US); Robert V. Blakey, Burlingame, CA (US); Sherwin S. Chiu, South San Francisco, CA (US); Roger Haynie, Dublin, CA (US)

(73) Assignee: Accenture Global Services Limited, Dublin (IE)

( * ) Notice: Subject to any disclaimer, the term of this patent is extended or adjusted under 35 U.S.C. 154(b) by 157 days.

This patent is subject to a terminal disclaimer.

(21) Appl. No.: 13/230,304

(22) Filed: Sep. 12, 2011

(65) Prior Publication Data

US 2011/0320238 A1    Dec. 29, 2011

Related U.S. Application Data

(63) Continuation of application No. 11/582,140, filed on Oct. 16, 2006, now Pat. No. 8,019,632.

(51) Int. Cl.
*G06Q 40/00* (2012.01)

(52) U.S. Cl.
USPC .......................................................... 705/10

(58) Field of Classification Search
USPC ...................................................... 705/7.24
See application file for complete search history.

(56) References Cited

U.S. PATENT DOCUMENTS

| | | | |
|---|---|---|---|
| 5,560,005 A | 9/1996 | Hoover et al. | |
| 6,308,887 B1 | 10/2001 | Korman et al. | |
| 6,466,918 B1 | 10/2002 | Spiegel et al. | |
| 2002/0099562 A1* | 7/2002 | Bruce et al. | 705/1 |
| 2005/0138013 A1* | 6/2005 | Walker et al. | 707/3 |
| 2005/0278708 A1 | 12/2005 | Zhao et al. | |
| 2006/0004856 A1 | 1/2006 | Shen et al. | |
| 2006/0117000 A1 | 6/2006 | Lulu | |
| 2010/0153150 A1 | 6/2010 | Prigge et al. | |

FOREIGN PATENT DOCUMENTS

| | | |
|---|---|---|
| WO | WO0101319 A1 | 1/2001 |
| WO | WO0133458 A1 | 5/2001 |

OTHER PUBLICATIONS

"Web service." [online] [retrieved on Oct. 3, 2006]. Retrieved from: http://en.wikipedia.org/wiki/Web_service, 3 pages.
"abstract class from FOLDOC:" [online] [retrieved on Oct. 3, 2006]. Retrieved from: http://foldoc.org/foldoc/foldoc.cgi?abstract+class, 1 page.

(Continued)

*Primary Examiner* — Hani M Kazimi
*Assistant Examiner* — Hatem M Ali
(74) *Attorney, Agent, or Firm* — Fish & Richardson P.C.

(57) ABSTRACT

The present disclosure includes systems and techniques relating to enterprise application integration. In general, one aspect of the subject matter described in this specification can be embodied in a computer system including a service oriented architecture (SOA), where the system includes a composite application configured to present sales targeted information by combining services from multiple application resources on a network, wherein the multiple application resources include: a sales force automation (SFA) tool configured to automate sales and sales force management functions; a real-time predictive analytics tool configured to evaluate customer purchasing data and recommend products or services based on the customer purchasing data; a knowledge management tool configured to search and retrieve data across multiple integrated applications; and a calendar tool configured to manage appointment scheduling. The multiple application resources can further include a collaboration tool; and a business intelligence tool, including at least one live news feed.

20 Claims, 6 Drawing Sheets

(56) References Cited

OTHER PUBLICATIONS

"class from FOLDOC." [online] [retrieved on Oct. 3, 2006]. Retrieved from: http://foldoc.org/foldoc/foldoc.cgi? class, 1 page.

"Composite application." [online] [retrieved on Oct. 3, 2006]. Retrieved from: http://en.wikipedia.org/wiki/Composite_applications, 1 page.

"Enterprise service bus." [online] [retrieved on Oct. 3, 2006]. Retrieved from: http://en.wikipedia.org/wiki/Enterprise_Service_Bus, 3 pages.

"inheritance from FOLDOC." [online] [retrieved on Oct. 3, 2006]. Retrieved from: http://foldoc.org/foldoc/foldoc.cgi?inheritance, 1 page.

"object-oriented programming from FOLDOC." [online] [retrieved on Oct. 3, 2006]. Retrieved from: http://foldoc.org/foldoc/foldoc.cgi?object-oriented+language, 1 page.

"Sales force management system." [online] [retrieved on Oct. 3, 2006]. Retrieved from: http://en.wikipedia.org/wiki/Sales_Force_Automation, 4 pages.

"Service-oriented architecture." [online] [retrieved on Oct. 3, 2006]. Retrieved from: http://en.wikipedia.org/wiki/Service-oriented_architecture, 9 pages.

* cited by examiner

SYSTEM AND METHOD OF INTEGRATING ENTERPRISE APPLICATIONS

CROSS-REFERENCE TO RELATED APPLICATION

This application is a continuation (and claims the benefit of priority under 35 USC 120) of U.S. application Ser. No. 11/582,140, filed Oct. 16, 2006, and titled "SYSTEM AND METHOD OF INTEGRATING ENTERPRISE APPLICATIONS," which is incorporated by reference in its entirety for all purposes.

TECHNICAL FIELD

The present disclosure relates to enterprise application integration.

BACKGROUND

Modern companies often rely on multiple enterprise applications (computer programs and systems designed to provide specific functionality) to help manage and run their businesses. For example, CRM (Customer Relationship Management) tools are often used by companies to manage their relationships with customers based on analysis of information stored for existing customers (and potential customers). In many cases, a company will have multiple independently established computer systems designed to address specific business processes or objectives. Such independent systems often come from different vendors and often cannot be readily integrated with each other.

Enterprise application integration involves the use of various methods, software and computer systems to integrate a set of enterprise computer applications, and various specific integrations of one application with another have been made previously. In addition, a more recent approach has involved moving toward a service-oriented architecture (SOA) in which resources on a network are made available as independent services that can be accessed without knowledge of their underlying platform. A SOA need not be tied to a specific technology and may be implemented using a wide range of interoperability standards, such as Remote procedure call (RPC), Distributed Component Object Model (DCOM), object request broker (ORB), and Web Services Description Language (WSDL).

SUMMARY

The present disclosure includes systems and techniques relating to enterprise application integration. In general, one aspect of the subject matter described in this specification can be embodied in a computer system including a service oriented architecture (SOA), where the system includes a composite application configured to present sales targeted information by combining services from multiple application resources on a network, wherein the multiple application resources include: a sales force automation (SFA) tool configured to automate sales and sales force management functions; a real-time predictive analytics tool configured to evaluate customer purchasing data and recommend products or services based on the customer purchasing data; a knowledge management tool configured to search and retrieve data across multiple integrated applications; and a calendar tool configured to manage appointment scheduling.

The multiple application resources can further include a collaboration tool configured to resolve access rights restrictions and allow multiple users to access information in real time; and a business intelligence tool configured to gather and organize business information from multiple sources, including at least one live news feed. The composite application can include a framework defining a translation service configured at runtime by checking for query handlers that fit in the framework, a query handler being configured to convert between a first language service of the SFA tool and a second language service of another of the application resources.

The SFA tool can include a customer relationship management (CRM) tool. The CRM tool can support on-demand indexing, and the knowledge management tool need not support on-demand indexing. Moreover, the knowledge management tool can support natural language queries.

In addition, the subject matter described in this specification can be embodied in a computer system including a service oriented architecture (SOA), where the system includes means for presenting sales targeted information by combining services from multiple network accessible means for providing application resources including: means for automating sales and sales force management functions; means for evaluating customer purchasing data and recommending products or services based on the customer purchasing data; means for searching and retrieving data across multiple integrated applications; and means for managing appointment scheduling.

The multiple network accessible means for providing application resources can further include means for resolving access rights restrictions and allowing multiple users to access information in real time; and means for gathering and organizing business information from multiple sources, including at least one live news feed. The means for presenting sales targeted information can include means for defining a translation service configured at runtime by checking for query handlers, a query handler including means for converting between a first language service of the means for automating and a second language service of another of the multiple network accessible means for providing application resources.

The means for automating can include means for managing customer relationships. The means for managing customer relationships can include means for on-demand indexing, and the means for searching and retrieving data across multiple integrated applications can include means for background crawling and indexing. Moreover, the means for searching and retrieving data across multiple integrated applications can include means for supporting natural language queries.

Another aspect of the subject matter described in this specification can be embodied in a computer-implemented method including combining services from multiple application resources on a network, the combining including interfacing with a sales force automation (SFA) tool configured to automate sales and sales force management functions, interfacing with a real-time predictive analytics tool configured to evaluate customer purchasing data and recommend products or services based on the customer purchasing data, interfacing with a knowledge management tool configured to search and retrieve data across multiple integrated applications, and interfacing with a calendar tool configured to manage appointment scheduling; and presenting sales targeted information from results obtained through the combining.

The combining can include interfacing with a collaboration tool configured to resolve access rights restrictions and allow multiple users to access information in real time. The combining can include interfacing with a business intelligence tool configured to gather and organize business information from multiple sources, including at least one live news feed. The combining can include checking for query handlers that fit in a framework defining a translation service configured at runtime; and converting with a query handler between a first language service of the SFA tool and a second language service of another of the application resources.

Interfacing with the SFA tool can include interfacing with a customer relationship management (CRM) tool. The combining can include connecting on-demand indexing supported by the CRM tool with background crawling and indexing supported by the knowledge management tool. The combining can include connecting on-demand indexing supported by the CRM tool with natural language queries supported by the knowledge management tool. Furthermore, the methods described in this specification can be embodied in a computer program product encoded on a computer-readable medium and including instructions operable to cause data processing apparatus to perform method operations.

Particular embodiments can be implemented to realize one or more of the following advantages. The robust knowledge repository of a traditional portal can be combined with a more active analytical tool capable of providing advice and collaborative functionality. Sales organizations can be provided with an integrated desktop with built-in, real-time analytics and real-time external data integration, including knowledge management and readily-accessible business intelligence.

An integrated view of customer data can be provided, enabling a better understanding of customers and the marketplace. User efficiency can be increased and training time decreased. Sales cycle time can be reduced, process quality and data integrity can be improved, and more consistent customer experiences can be fostered.

New capabilities can be developed more rapidly and readily integrated into the system. Data from multiple resources can be combined in a composite application for presentation and interaction among the resources, and the data can remain in the respective resources. There is no need to store all data from all sources in a CRM tool. Thus, customized features can be developed and added to a unified solution sales package with decreased implementation risk, and sales agents can be given rapid access to relevant content needed to support customer care and sales efforts.

Owners of the system can be protected from the rapidly changing standards and technology choices facing companies, since changes in an underlying system component can be accommodated by a corresponding change in a translation service employed by the larger system without affecting other system components. Moreover, a solution sales system can provide a comprehensive set of pre-integrated components along with a lightweight reusable framework for custom application development, allowing rapid response to business changes.

The details of one or more embodiments of the present systems and techniques are set forth in the accompanying drawings and the description below. Other features, aspects, and advantages will become apparent from the description, the drawings, and the claims.

DETAILED DESCRIPTION

Figure 1:
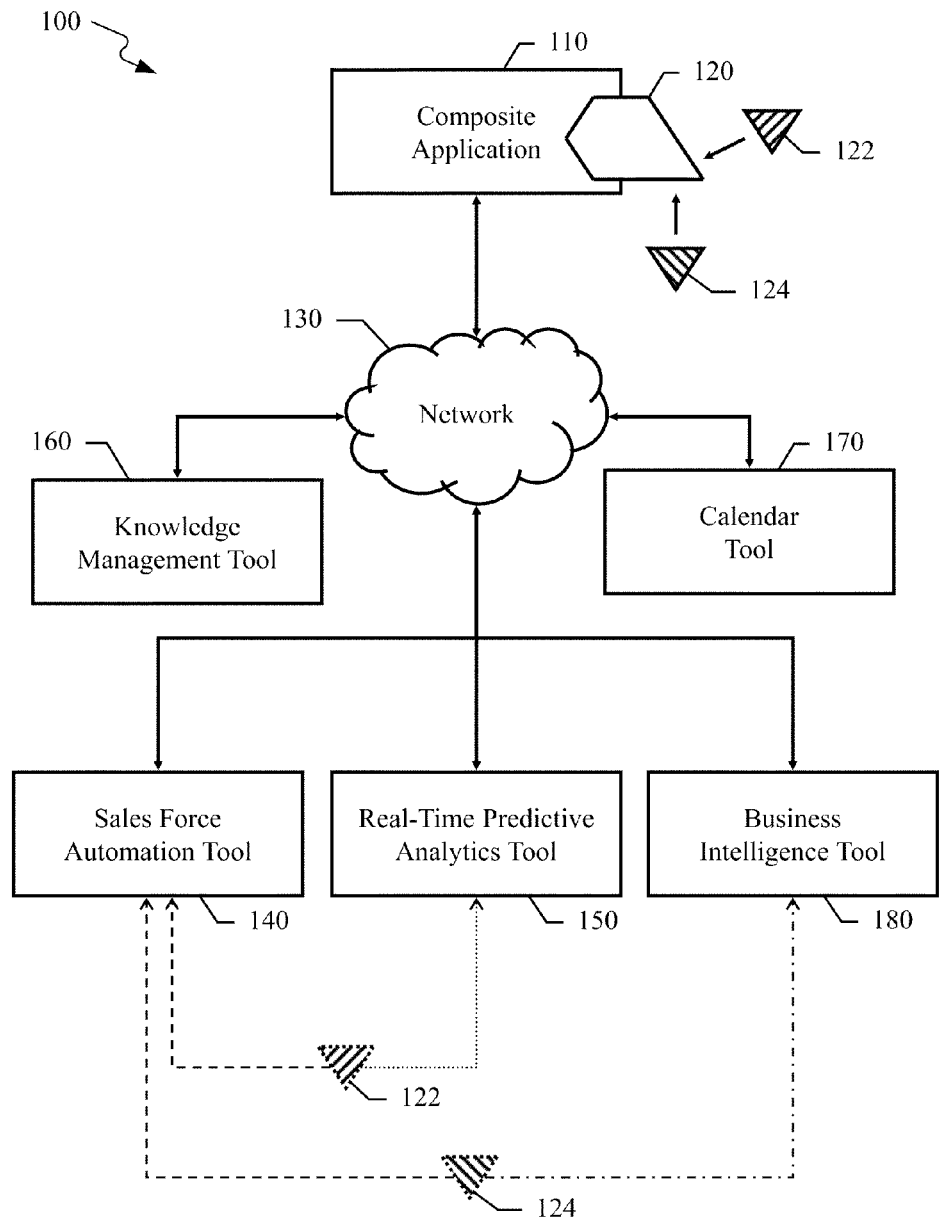
FIG. 1 shows an example SOA computer system.

FIG. 1 shows an example SOA computer system 100. The computer system 100 combines multiple loosely coupled services into a composite application 110, which can be implemented using an enterprise portal, web portal, or other user interface structure. The composite application 110 presents sales targeted information by combining services from multiple application resources on a network 130, which can be a local area network, wide area network, public network, enterprise network, or a combination of these.

As used herein, the term "SOA" indicates a service-oriented architecture in general, and does not imply compliance with any particular SOA standard. In addition, the terms "application resource" and "tool" are used (interchangeably) herein to refer to a combination of software and hardware. Note that a "tool" can thus include a software application sold by a first vendor and an underlying computer platform (hardware plus operating system) sold by one or more different vendors.

The application resources combined by the composite application 110 include a sales force automation (SFA) tool 140, a real-time predictive analytics tool 150, a knowledge management (KM) tool 160, and a calendar tool 170. The SFA tool 140 can be configured to automate sales and sales force management functions. The SFA tool 140 can include additional sales and marketing directed functionality. For example the SFA tool 140 can be a customer relationship management (CRM) tool, such as existing CRM tools that are commercially available from Oracle Corporation of Redwood Shores, Calif. (and also Siebel Systems, Inc., which was purchased by Oracle Corporation).

The real-time predictive analytics tool 150 can be configured to evaluate customer purchasing data and recommend products or services based on the customer purchasing data, such as Real-Time Decision (RTD) software available from Sigma Dynamics (whose intellectual property was purchased by Oracle Corporation of Redwood Shores, Calif.). The real-time predictive analytics tool 150 can be used to provide sales agents with insights about customer purchasing history and preferences, matched against recommended solutions.

The KM tool 160 can be configured to search and retrieve data across multiple integrated applications, such as InQuira software available from InQuira, Inc. of San Bruno, Calif. The KM tool 160 can be leveraged to provide a comprehensive content management and knowledge management solution for identifying, acquiring, organizing and sharing any type of enterprise information with co-workers, customers or customer-facing agents. This component can support natural language queries and can derive the intent of an agent's request based on advanced linguistic techniques, rapidly delivering an accurate answer. In effect, the advanced knowledge management capability within the portal can multiply the potential impact of any single sales representative by synthesizing the experiences of all sales persons, categorizing such experiences and making them available in a configured manner to help close a deal.

The calendar tool 170 can be configured to manage appointment scheduling and can also be configured to manage electronic communications, such as Microsoft Outlook and Exchange Server software, available from Microsoft Corporation of Redmond, Wash. Managing contacts and keeping track of meetings and appointments is a big part of any sales agent's day. Many agents rely on the Microsoft Outlook e-mail product to manage contacts and meetings, and find it time-consuming to synchronize their local information with an enterprise CRM system. By integrating the calendar tool 170 that includes contact and email functionality (e.g., Microsoft Exchange Server), an agent can update contact information or schedule meetings, and the system 100 pulls these data objects from the tool 170 and displays them within the user interface (e.g., within a enterprise portal), which can significantly boost agent productivity and make relevant information available to other agents.

Additional application resources can also be combined in the system 100, such as a business intelligence tool 180 or a collaboration tool (not shown). The business intelligence tool 180 can be configured to gather and organize business information from multiple sources, including at least one live news feed. For example, the business intelligence tool 180 can include business insight software available from OneSource Information Services, Inc. of Concord, Mass. The business intelligence tool 180 can provide integrated business content from a library of business knowledge, including news, articles, trends and market research, integrated from thousands of sources worldwide.

Integrating a business intelligence tool 180 allows the system to present biographies of key executives, strategic initiatives of the company, and also industry analysis for the particular industry an account is in, such as competitors and industry trends. This allows the sales professional to get a full picture of that account and also the industry context for the account (company). Based on this intelligence, delivered directly into the user interface, agents can uncover risks from changes in corporate structures, mergers and regulatory changes, and react quickly to changes in positioning. They can efficiently evaluate prospective partners or competitors, and can craft more personalized campaigns and messages.

The collaboration tool can be configured to resolve access rights restrictions and allow multiple users to access information in real time. For example, the collaboration tool can include Share Point Portal Server software, available from Microsoft Corporation of Redmond, Wash. Using a collaboration tool can enable any person with access to the web to work simultaneously with the sales agent to address an issue. For example, a sales agent in pursuit of a deal may have a need for quick advice and guidance from an internal or external expert. Thus, the system 100 can include a collaboration tool to allow collaborators to access the same system information in real time.

The system 100 can be viewed as a solution sales portal that presents sales targeted information to sales agents. The system 100 can also be viewed as an integrated desktop for sales agents. The system 100 can deliver business capabilities such as pipeline management, automated probability of sale, automated up sell/cross sell recommendations based on historical data, collaboration, and natural language searching. These business capabilities can be provided to sales representatives in a single, integrated sales desktop application leveraging enabling technologies from Siebel, Siebel RTD (Sigma Dynamics), InQuira, OneSource, and Microsoft (as mentioned above).

Integrating such independently established systems (e.g., Oracle/Siebel, SAP, etc.) across disparate business processes can be accomplished using data replication via custom interfaces with front office and back office systems. Many application resources available from commercial vendors have recently introduced support for SOA, but such systems often fail to employ a common, standardized language for the services offered. For example, the Siebel Component Assembly (SCA) product (introduced in 2005) provided a SOA for interfacing with the product, but this service was limited to connecting to data sources that can be viewed as databases. Thus, the SCA product issues Structured Query Language (SQL) statements to other data sources.

To address these differences in language (communication interface protocols/formats) for the various services offered by the application resources 140-180, the system 100 can include a translation service that operates between the tools. The translation service can take a query from a first of the tools, turn this query into a query formatted appropriately for a second of the tools, and then repackage the result of the query as appropriate for return to the first tool.

The translation service can be part of the composite application 110, which can include a framework 120 that defines the translation service. The framework 120 can allow the translation service to be configured at runtime by checking for query handlers that fit in the framework 120. For example, the framework 120 can include an abstract class for query handlers whose code are located and incorporated into the composite application at runtime. Thus, query handlers 122 and 124 can be identified, loaded and executed at runtime to perform translations. A first query handler 122 can be configured to convert between a first language service of the SFA tool 140 and a second language service of the real-time predictive analytics tool 150, and a second query handler 124 can be configured to convert between the first language service of the SFA tool 140 and a third language service of the business intelligence tool 180. Thus, the system 100 can be readily expandable by adding new query handlers to convert a language service of a newly added application resource.

Figure 2:
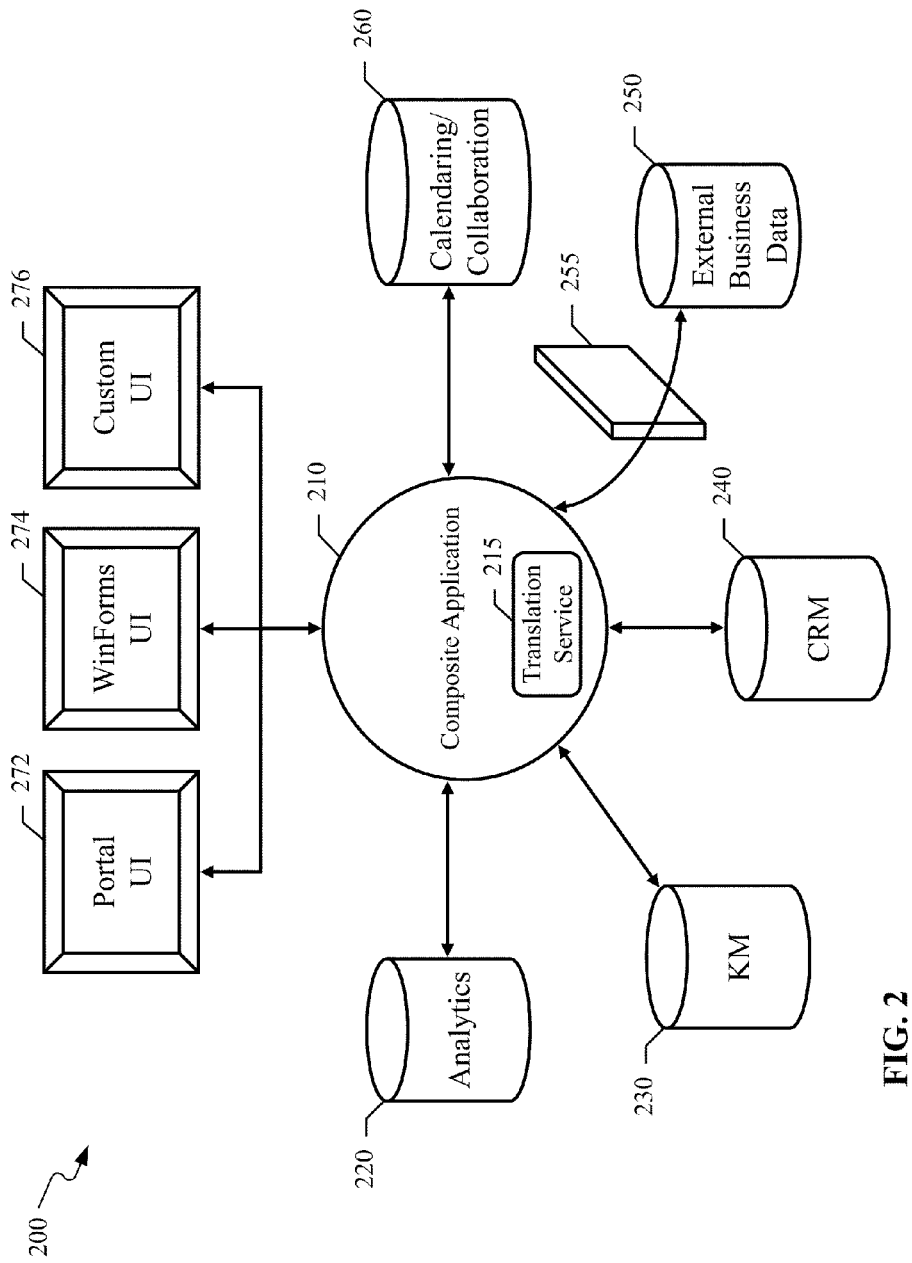
FIG. 2 shows another example SOA computer system.

FIG. 2 shows another example SOA computer system 200. As with the system 100, the system 200 can support first point of contact interactions with customers, providing sales agents with on-demand, relevant, real-time external data feeds, and ready access to analytics based on both external and internal intelligence sources. The system 200 can include a composite application 210 with a translation service 215 built on top of an existing SOA product, such as the Siebel Component Assembly product, and the composite application 210 can provide a componentized CRM application. In addition, the translation service 215 can employ an open, XML (Extensible Markup Language) meta-data based framework.

The system 200 includes an analytics resource 220, such as can be provided by RTD software available from Sigma Dynamics (whose intellectual property was purchased by Oracle Corporation of Redwood Shores, Calif.). The analytics resource 220 can be configured to run analysis on historical data and real-time stream events. The analytics resource 220 can include a built-in, fully configurable proactive alerts engine, and performance management and customer feedback tool (CSAT). Moreover, the analytics resource 220 can provide product ranking and recommendations with likelihood of acceptance indications.

The system 200 includes a knowledge management (KM) resource 230, which can include natural language search capabilities, such as can be provided by InQuira software available from InQuira, Inc. of San Bruno, Calif. The system 200 includes a Customer Relationship Management (CRM) resource 240, such as can be provided by existing CRM tools that are commercially available from Oracle Corporation of Redwood Shores, Calif. (and also Siebel Systems, Inc., which was purchased by Oracle Corporation).

The system 200 includes a real-time external business data resource 250, such as can be provided by business insight software available from OneSource Information Services, Inc. of Concord, Mass., which can be accessed through a firewall 255. The system 200 includes calendaring and/or collaboration resource(s) 260, such as can be provided by Outlook, Exchange Server and Share Point Portal Server software, available from Microsoft Corporation of Redmond, Wash.

The system 200 can interact with sales agents and managers in a variety of ways. The system 200 can include a portal user interface (UI) 272, a WinForms based UI 274, a custom UI 276, or a combination of these. In any event, the UI can provide a unified view of customer data pulled from multiple integrated systems. The system 200 can provide up-to-date sales support recommendations, offerings, information and alerts. In addition, the system 200 can provide separate account manager and executive views.

The composite application 210 can employ a SOA that runs natively on .NET and J2EE application servers. The composite application 210 can interface with the resources 220, 230, 240, 250, 260 to provide operational CRM functionality, such as forecasting, quoting, lead distribution, opportunity management, order management, proposal generation, collaboration and pipeline management. The composite application 210 can interface with the resources 220, 230, 240, 250, 260 to provide business insight functionality, such as cross sell/up sell, knowledge management, compensation/attainment, competency/learning, performance management, metrics and new product introduction. Moreover, the composite application 210 can interface with the resources 220, 230, 240, 250, 260 to provide productivity functionality, such as calendar, email, contact and task management.

The system 200 can perform analyses of both historical customer data and real-time stream events, and can provide product rankings and recommendations. A fully-configurable, proactive alerts engine can deliver timely advice to sales personnel: customized alerts about meetings, training events, etc., as well as alerts about opportunities and solutions, recommending appropriate products or services for targeted customers, and predicting the likelihood of customer interest.

Each resource 220, 230, 240, 250, 260 can be integrated into the system 200 using a custom interface appropriate to each respective underlying system. Furthermore, integration of a resource 220, 230, 240, 250, or 260 can involve the use of an existing SOA CRM product, such as the Siebel Component Assembly (SCA) product. For example, the calendaring and/or collaboration resource(s) 260 can be integrated using custom adapter(s) through SCA that connect directly to the Microsoft Exchange server to provide calendar and contact synchronization functions. SCA also packages a custom Outlook Add-In that can be installed in Outlook to provide sales data that can be directly accessed in Outlook. The Sharepoint Portal Server embeds the custom Sharepoint TeamSpace site directly in the Portal UI. A user can automatically create shared team spaces against sales entities in order to share specific information to external users that might not have direct access to the sales portal. This team space can be viewed through the embedded object in the portal UI, or can be accessed directly through a URL link directly accessing the Sharepoint Portal Server.

Figure 3:
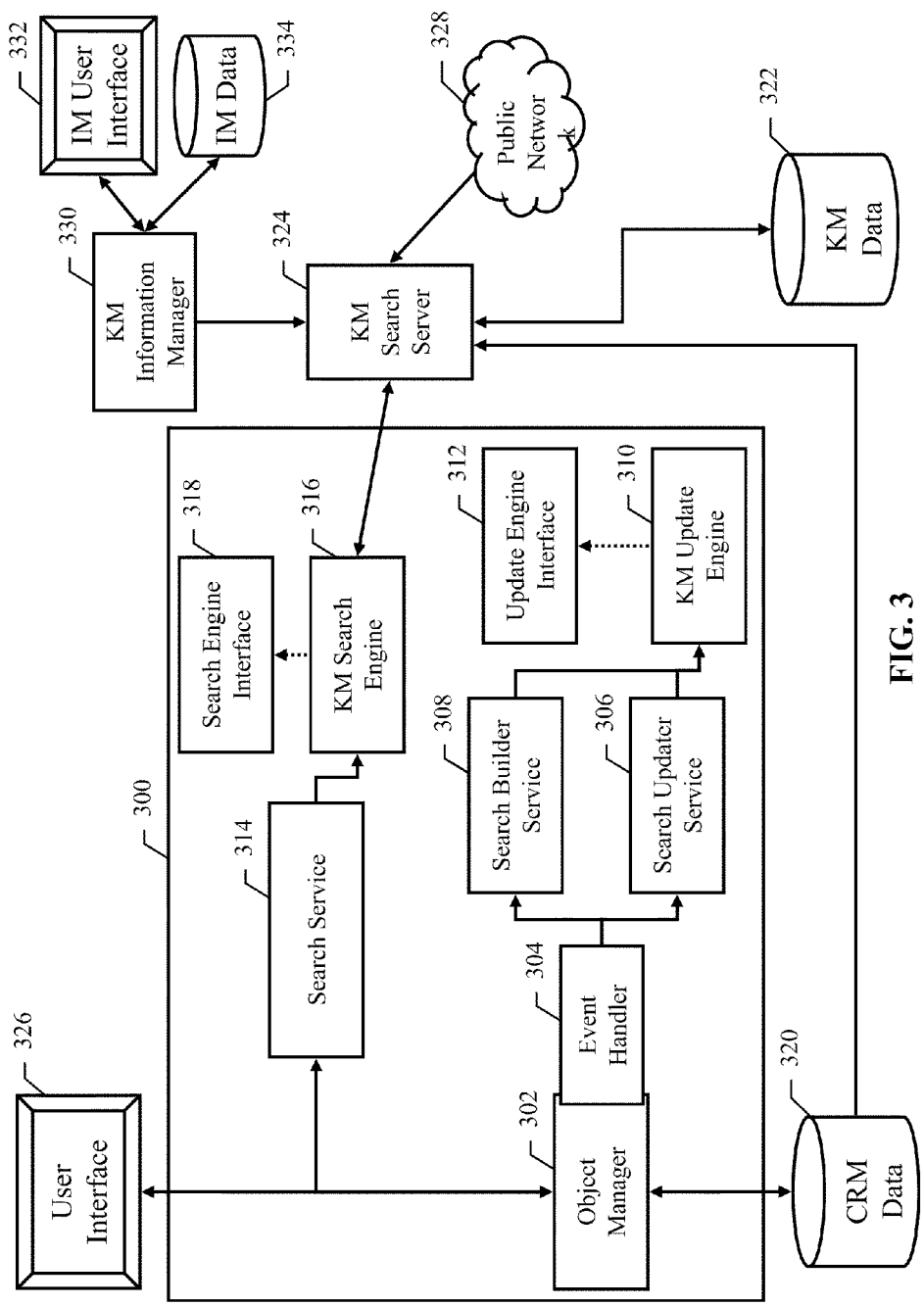
FIG. 3 shows an example integration between a CRM tool and a knowledge management (KM) tool.

FIG. 3 shows an example integration between a CRM tool and a knowledge management (KM) tool. A middle tier component 300 of a CRM tool (e.g., an SCA application server) can connect CRM data 320 to a user interface 326 through an object manager 302. The CRM data 320 can be provided to a KM search server 324 of the KM tool. In this example, the CRM tool supports on-demand indexing, whereas the KM tool does not support on-demand indexing. Rather, the KM tool performs background crawling and indexing of data.

Thus, the CRM data 320 can be provided to the KM search server 324 for crawling and indexing.

The middle tier component 300 of the CRM tool can include an event handler 304 that triggers both a search updater service 306 and a search builder service 308. These in turn feed data to a KM update engine 310. Likewise, a search service 314 can feed data to a KM search engine 316. The CRM component 300 runs the update and builder services 306 and 308 at run time, triggered by the event handler 304. The CRM component 300 also provides an update engine interface 312 and a search engine interface 318. The interfaces 312 and 318 allow the integration of the CRM component 300 with the search server 324.

Because the CRM component 300 uses the search engine 316 to build and update at runtime, if the search engine 316 does not already support this, the search engine 316 can be modified to create dummy build and update engines. Note that this can be updated if a later release supports on-demand indexing. When the search server 324 does not support on-demand indexing, the search server 324 can provide the ability to crawl and index data independent of the CRM component 300.

The KM search server 324 can index information found in the CRM data 320, an KM information manager 330, and a public network 328 (e.g., the Internet). The KM search server 324 is operationally connected to KM data 322, where the indexing is stored. The KM tool can support natural language queries and can include the KM information manager 330 that connects with information manager (IM) data 334 and an IM user interface 332. Note that the analytics tool can also use the Information Manager/Content Manager to provide input.

When searching, the response for the CRM tool's data can be tailored to display and function within the tool seamlessly. For a response outside of the CRM tool, like a website, an Internet browser can be opened instead of inside the CRM tool. The search engine can be tailored to limit data based on the intent of the CRM tool. For example, when searching for a company, the word "company" can limit the search to only company objects. This aspect can be provided as part of the natural language querying.

Figure 4:
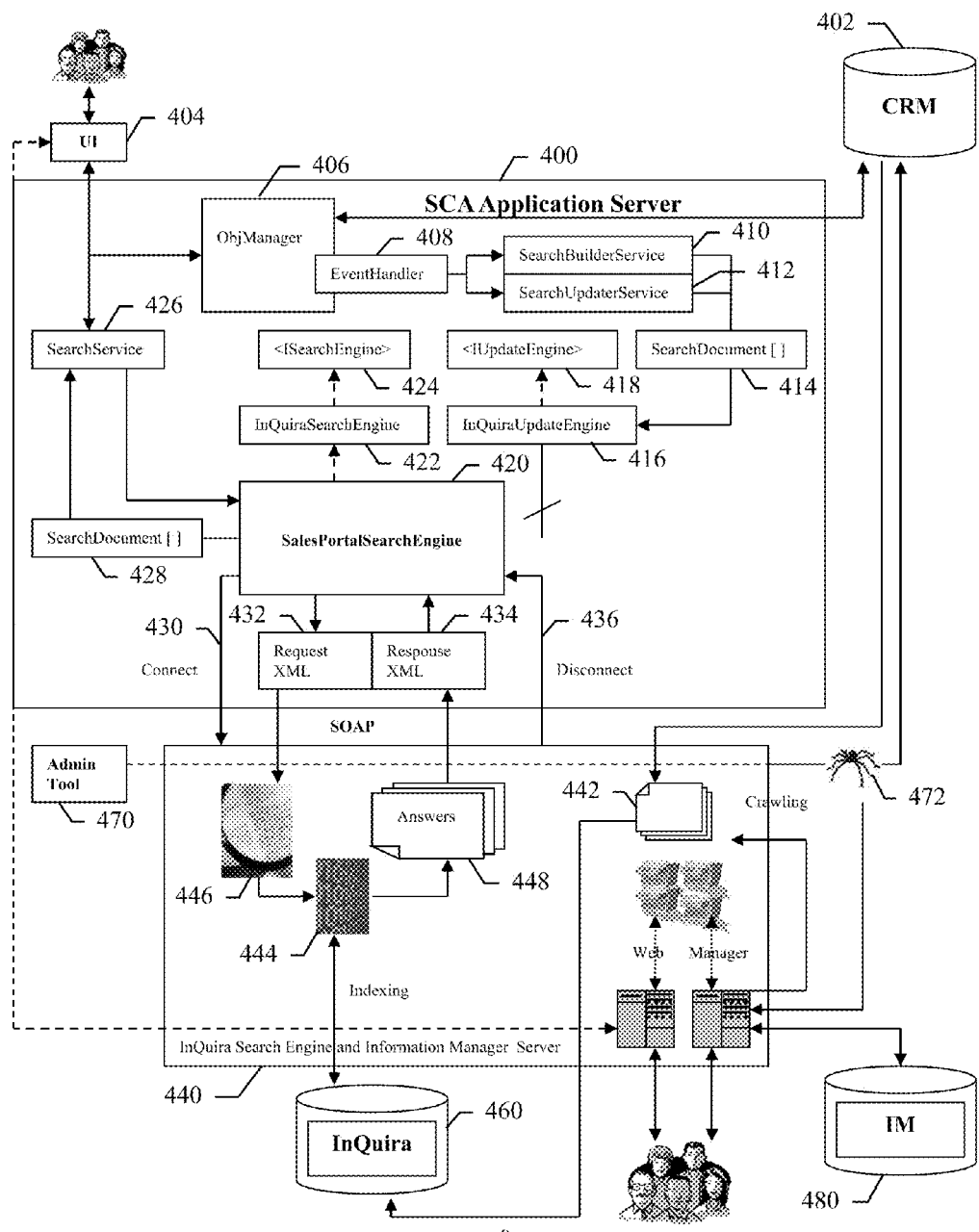
FIG. 4 shows another example integration of a KM tool with a CRM tool.

FIG. 4 shows an example integration of a KM tool (including InQuira software) with a CRM tool (including SCA software). Siebel Component Assembly (SCA) allows third party search engines to be integrated by implementing at least two interfaces. One is responsible for aiding the process of building indexes, and the other is responsible for aiding the process of searching and returning data. Both of these processes run on-demand within SCA. However, InQuira's system does not support on-demand indexing, so the architecture of SCA search changes a little when connecting to the InQuira architecture.

The SCA search component includes an SCA application server 400 that connects a CRM database 402 with a user interface 404. When a user performs a command, a service starts. The service calls the corresponding engine class to communicate with the search server. If it is a search command, data is returned back to the user.

The SCA search component includes build and update functionality used to index information to be searched. The SCA application server 400 includes an object manager 406, event handler 408, search builder service 410 and search updater service 412. These can generate an array of documents 414, which can be converted by IUpdateEngine 418 into the search engine server's expected document object for indexing. For example, a search document can be converted into an IDocument object then passed to the search engine server to index. An InQuiraUpdateEngine 416 can handle the interface to the InQuira search server 440. In some implementations, the InQuiraUpdateEngine 416 need not update the InQuira search server 440, and in other implementations, the InQuiraUpdateEngine 416 does update the InQuira search server 440.

In addition to indexing functionality, the SCA search component includes search functionality. A sales portal search engine 420 (an implementation of ISearchEngine 424) takes a query from search service 426 and converts the query into the search server's request object and passes the request object to the search server. The search server returns its response to the sales portal search engine 420, which then converts the response into an array of search documents 428 and returns this array to the search service 426. An InQuiraSearchEngine 422 can handle the interface to the InQuira search server 440. Moreover, communications with the InQuira search server 440 can be performed using SOAP (Simple Object Access Protocol), starting with connect 430, then sending an XML request 432, receiving an XML response 434, and terminating with disconnect 436.

In the SCA search component, a search document should be in the same format when it gets built or indexed and when it gets returned from a search. A search document's format is derived from the format of the corresponding search object (searchObj) created using the workbench. A searchObj is not only responsible for setting the values to be indexed and searched; a searchObj also specifies the related business component (busComp) and sets UI functionalities. The busComp is the corresponding business object in SCA that is to be searched and displayed. If the searchObj relates to an external object, any busComp will work; it just will not be used. The resultFields in the searchObj is what will be displayed in a list of results. Under uiInfo, the resultDescriptionField and resultNameField are set using the resultFields. The drillDownDef defines what will be displayed when this searchObj is clicked.

The InQuira system provides a search engine server that allows natural language querying. InQuira has an API (Application Program Interface) to integrate with an application and uses SOAP to communicate with the server. InQuira builds indexes by going through each object of a collection, better known as crawling, preprocessing each object, placing each processed object into a database, and finally indexing each object. As of version 7.2, Zena (InQuira's API) does not support on-demand indexing. Because of this, indexing is done by using InQuira's Admin Tool 470. A crawler 472 is created for each collection, and a set of tasks are processed to index a collection. When the SearchBuilderService 410 or SearchUpdaterService 412 is called, the InQuira Server Implementation of IUpdateEngine 418 does nothing since on-demand indexing is not supported.

InQuira has database, Web, file, Siebel CRM and Information Manager crawlers available to be configured to match the desired collection. However, the Siebel CRM crawler cannot be used to crawl SCA objects because it is a different CRM. Nonetheless, SCA objects derive from the database. Every SCA object to be searched has a searchObj, and that searchObj has a corresponding database crawler with a specific SQL statement that selects the rowid (row identifier), all corresponding fields stated in that searchObj and all relationships defined by the foreign keys in the table(s). Another way to view this is to determine what the search engine implementation of InQuira needs to create from a search document to correspond to a searchObj and what relationships need to be searched against for this object. Take for instance the Opportunity object. Every Opportunity has an Account or Company. If asked, "What Siebel Opportunities are there?", the corresponding Account or Company name must be selected for this relationship to be searchable. Thus, records 442 can be pulled from the CRM database 402, preprocessed and stored in the InQuira database 460, and an index 444 formed.

InQuira searches by connecting to the server through SOAP, querying the server, receiving the response, converting the response to corresponding search documents, and returning the resulting search documents. The sales portal search engine 420 (in combination with InQuiraSearchEngine 422) implements these tasks to integrate InQuira Search with SCA. The sales portal search engine 420 can use the class, IClient, from the InQuira API, j2eeclient.jar, to connect and query the server. To connect, server properties are set prior to attempting to connect, which is all done in initialize( ). To query, IClient expects a request as a string in XML format, and another string in XML format is returned as the response. The sales portal search engine 420 can parse the XML response and convert each answer into a search document based on the corresponding searchObj. Finally, the resulting search documents are returned to the search service 426.

The InQuira system can also provide natural language query functionality. When a search is requested, the query gets processed against a dictionary 446 including concepts and rules. A concept is a grouping of related words; a rule is a regular expression to be matched against and decides what would be the next step in finding answers 448 for the query. This is done by the InQuira Search Engine Server 440.

In addition, the InQuira system includes a information manager, which can be integrated with the InQuira search engine server 440. The information manager is a content management system that allows multiple users to be able to view documents and upload modified or new documents. The information manager can connect with the Web and with an information manager database 480. The information manager can be used as an external component of the executive sales portal and can be used when it is being searched or when it is used as a website.

The InQuiraSearchEngine 422, InQuiraUpdateEngine 416, and Sales Portal Search Engine 420 can be implemented using java classes. The InQuiraUpdateEngine 416 can employ a dummy class that implements IUpdateEngine 418 as described above. The InQuiraSearchEngine 422 can employ an abstract class that implements ISearchEngine 424 and helps aid integration between SCA and InQuira. The InQuiraSearchEngine abstract class contains common methods to connect, query, and parse the response from InQuira. If SCA is in a .NET platform, a web service can be created to communicate with InQuira, which can be provided in a Java platform. The sales portal search engine 420 is an implementation of the InQuiraSearchEngine class that supports SCA objects, Opportunity and Company (assuming the crawler name is the same), Information Manager with repository name, sales portal, and crawler name, IM, and Web and file collections that have a searchObj name, "InQuiraContent." If these criteria do not match, the InQuiraSearchEngine abstract class can be implemented by extending it and implementing the abstract methods.

In some implementations, there are nine methods. For example, method printResponseXMLFlag can be a basic flag that returns true if the developer wants to export the response from the InQuira Search Server onto a file (e.g., response.xml in C:/). In production, this value should be false, as this is meant for debugging purposes only. Method getSCACollectionsNames can return a String array of all SCA collection names. Method getDefaultSearchObjectName can return the name of a Search Object in SCA reserved for default browser/

URL based content. Method getIMRepositoryName can return the name of the Information Manager Repository used. If there are multiple repositories being used, the custom methods, which are described below, can be used. Method getIMCollectionNames can return a String array of all IM collection names. The five methods just described can all be hard-coded.

The custom methods, on the other hand, may not be needed if the methods just described are sufficient. If custom methods are not needed, simply return empty, false, or null values. Method getCustomCollectionName and getCustomID can return the collection name and ID respectively from an answer element. The answer element can be an org.w3c.dom.Element in xml form. Each custom collection answer may be different. Method getCustomFieldValue can return the value corresponding to the specified field name in SCA for a customized collection from an answer element. This can be done in similar fashion as getCustomCollectionName and getCustomID. Finally, method is CustomObject can return true if the name given corresponds to one of the custom objects names.

The above described approach to integrating a KM tool with a CRM tool can provide significant flexibility, allowing many different types of collections to be searched. In addition, as mentioned above in connection with FIG. 1, a framework 120 can be used to simplify the integration of new application resources and language services into the SOA system. For example, the framework 120 can be use to implement data integration web services for both the real-time predictive analytics tool 150 (e.g., Sigma Dynamics) and the business intelligence tool 180 (e.g., OneSource).

Figure 5:
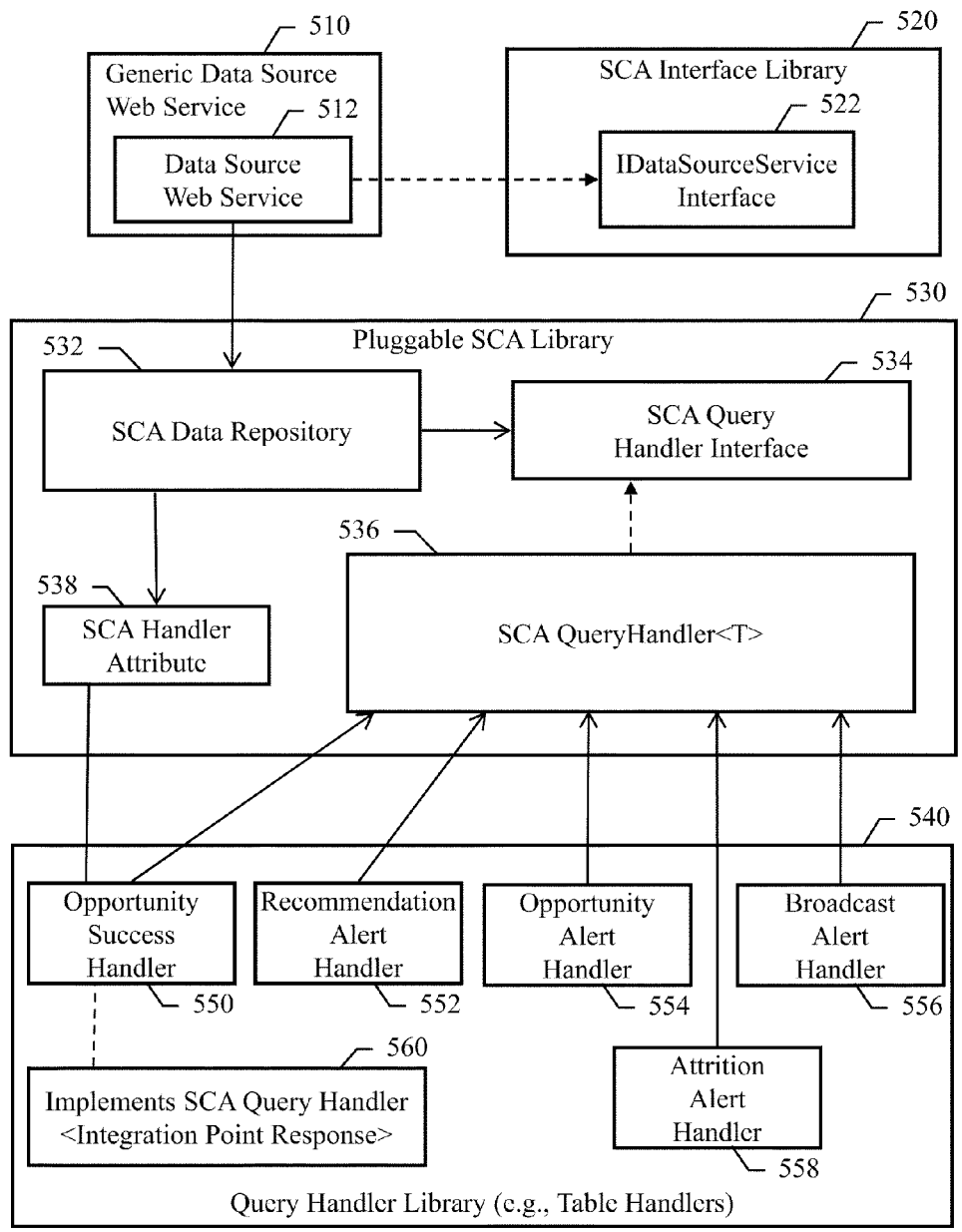
FIG. 5 shows an example reusable service framework for integrating new tools into a composite application.

FIG. 5 shows an example reusable service framework for integrating new tools into a composite application. This example is described in the context of integrating OneSource, Sigma Dynamics and SCA, but is more generally applicable to other system integrations as well. For SCA, integration with external systems was supported by emulating a database interaction pattern (i.e. use the database integration infrastructure provided with SCA). To integrate new resources with SCA in a composite application, a web service can be implemented that accepts SOAP based SQL queries from SCA, determines and retrieves the desired data from an external system, and then massages the returned data into a tabular format that is sent back to SCA.

The required types and interfaces used by Siebel SCA for database-oriented communication are available to developers. For example, datasource-interface.wsdl defines the IDataSourceService type that should be implemented for a web service to be callable by SCA. In addition, Siebel's SCA schemas use features of the XML Schema standard, for example polymorphic types. These features are fully supported in Microsoft's .NET framework. Thus, the web services described can be implemented using Microsoft's .NET 2.0, C#2.0, and Asp.net 2.0 technologies.

The reusable service framework benefits from the high level of commonality inherent in the database emulation approach described above, and this reusable framework allows several external systems (e.g., OneSource and Sigma Dynamics) to be readily integrated into the composite application (e.g., a sales portal). The framework seeks to minimize the amount of time required to integrate new systems with SCA and creates a simplified extension mechanism of existing integration functionality.

The reusable service framework can be viewed as a pluggable architecture. This architecture can include a generic data source web service 510 including a data source web service 512 that implements the IDataSourceService interface 522 for SCA. The IDataSourceService interface 522 can be an ASP.NET web service derived class that handles requests to the web service's .asmx file. This class can implement the IDataSourceService interface 522 defined by the SCA file datasource-interface.wsdl. The IDataSourceService interface 522 can delegate all requests to the SCADataRepository class to service the actual request. Furthermore, the architecture can include an SCA interface library 520 generated from SCA data source schemas. The SCA interface library 520 can be a C# .dll (dynamic link library) generated from the Siebel SCA data source related schemas using wsdl.exe (e.g., proxies generated from DataSource-Interface.wsdl).

The architecture can include a pluggable SCA library 530 that leverages .NET Attributes and Reflection in order to find and load query handlers dynamically at runtime. The pluggable SCA library 530 can include an SCA data repository 532, which is a class delegated to by web service to handle SCA query or update requests. The SCA data repository 532 contains a static constructor that uses Reflection to locate Types marked with the SCAQueryHandlerAttribute in the containing application's CodeBase and constructs Dictionary mapping table name strings to the Types.

The SCA library 530 can include an SCA QueryHandler interface 534, which is a base interface for classes wishing to act as query handlers. An SCA QueryHandler<T> 536 is an abstract base class for all query handler classes. The SCA QueryHandler<T> 536 implements the SCA QueryHandler interface 534. In addition, an SCA QueryHandlerAttribute 538 is a .NET Attribute attached to all query handler classes, and which declares the SCA database table name for which the class handles queries.

The above described portions of the pluggable architecture can remain unchanged for each new integration, and the architecture can include a query handler library 540 that is customized for each external service that will be integrated with SCA. A query handler class can be created for each Data Object that is mapped to the third party external service via a Federation Block in Siebel Workbench. This class can be derived from SCA QueryHandler<T> 536 and have the SCA QueryHandlerAttribute 538 (with the name of the table handled) applied to the class definition. For example, the following definition of OpportunitySuccessHandler 550 can be used:

```
[SCAQueryHandler("SD_OPPORTUNITY_SUCCESS")]
public class OpportunitySuccessHandler : SCAQueryHandler<IntegrationPointResponse>
{
    public OpportunitySuccessHandler( )
    {
    }
    protected override RowType[ ] ConstructSCARows(IntegrationPointResponse source, string keyColumn, string keyValue)
    {
        //body removed for clarity
```

```
}
protected override IntegrationPointResponse FetchQueryResults(string id)
{
    //body removed for clarity
}
}
```

In FIG. 5, various query handlers for Sigma Dynamics are shown. These query handlers service Sigma Dynamics query requests and can include OpportunitySuccessHandler 550, RecommendationAlertHandler 552, OpportunityAlertHandler 554, BroadcastAlertHandler 556, and AttritionAlertHandler 558. The OpportunitySuccessHandler 550 handles SCA table SD_OPPORTUNITY_SUCCESS. The RecommendationAlertHandler 552 handles SCA table SD_RECOMMENDED_SOLUTIONS. The OpportunityAlertHandler 554 handles SCA table SD_OPPORTUNITY_ALERT. The BroadcastAlertHandler 556 handles SCA table SD_BROADCAST_ALERT. The AttritionAlertHandler 558 handles SCA table SD_PRODUCT_ATTRITION. Each of these handlers can derive from SCAQueryHandler<T> 536 with a parameterization of IntegrationPointResponse 560, which is defined in the sdclient-.dll library distributed with Sigma Dynamics.

Although not shown in FIG. 5, additional query handlers for OneSource can be added to the query handler library 540 or a separate library specific to OneSource. These can include CompanyExecutivesRTBuilder (which handles SCA table OS_EXECUTIVES), BusinessSummaryQueryHander (which handles SCA table OS_BUS_SUMMARY), CAReportsQueryHandler (which handles SCA table OS_COMPANY_ANALYSTS_REPORTS), ExecutiveBioQueryHandler (which handles SCA table OS_EXEC_BIO), NewsHeadlinesQueryHandler (which handles SCA table OS_RELATED_NEWS), ExecEducQueryHandler (which handles SCA table OS_EXEC_BIO_EDUCATION), ExecNewsQueryHandler (which handles SCA table OS_EXEC_BIO_NEWS), StrategicInitQueryHandler (which handles SCA table OS_STRATEGIC_INITIATIVES), CorpFamilyQueryHandler (which handles SCA table OS_CORPORATE_FAMILY), ArticlesQueryHandler (which handles SCA table OS_ARTICLES), BalanceSheetQueryHandler (which handles SCA table OS_BALANCESHEET), RatiosQueryHandler (which handles SCA table OS_RATIOS), CashFlowQueryHandler (which handles SCA table OS_CASHFLOW), and IncomeStatementQueryHandler (which handles SCA table OS_INCOMESTATEMENT). Each of these query handlers for OneSource can derive from SCAQueryHandler<T> 536 with a parameterization of XmlNode, which is defined in the System.Xml namespace of .NET. In addition, a OneSourceFormatHelper static class can be included, which provides a simple string formatting helper function called ToCurrencyString.

As will be understood, the above reusable framework involves various deployment dependencies. For the generic web services, the SCA Interface Library depends on the SCA Data Repository Library, and both of these depend on the active server methods (ASMX) web service. Note that since Reflection is used to locate query handlers, no query handlers need be present for deployment, although the service will not do anything without at least one query handler being present at runtime. For the Sigma Dynamics web service, an sdclient.dll library can be used by the query handlers to communicate with the Sigma Dynamics server; the sdclient.dll library depends on the Sigma Dynamics table handlers, which depend on the SCA Data Repository Library, which depends on the ASMX web service, and the SCA Interface Library depends on the Sigma Dynamics table handlers, the SCA Data Repository Library, and the ASMX web service.

For the OneSource integration, the deployment dependencies are as follows. OneSourceQueryProxy and OneSourceReportsProxy are proxy libraries generated from the published OneSource wsdl file using the wsdl.exe utility distributed with Visual Studio 2005. These two libraries can be used by the query handlers to communicate with the OneSource web service. The OneSourceQueryProxy and OneSourceReportsProxy depend on the OneSource table handlers, which depend on the SCA Data Repository Library, which depends on the ASMX web service, and the SCA Interface Library depends on the OneSource table handlers, the SCA Data Repository Library, and the ASMX web service.

Figure 6:
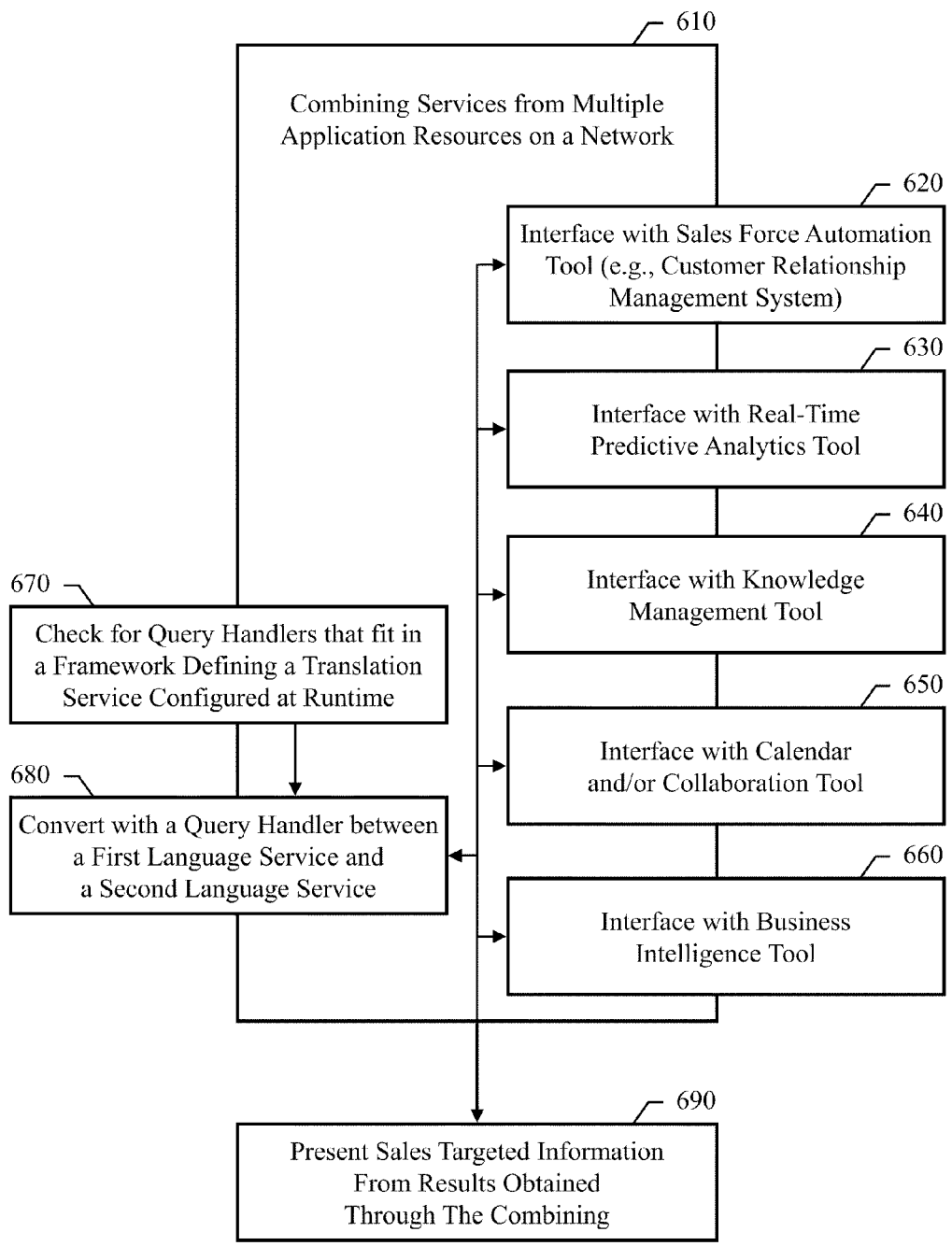
FIG. 6 shows example processes of integrating tools into a composite application.

FIG. 6 shows example processes of integrating tools into a composite application. Services from multiple application resources on a network can be combined (610). This can involve interfacing (620) with a sales force automation tool configured to automate sales and sales force management functions (e.g., a CRM tool), interfacing (630) with a real-time predictive analytics tool, interfacing (640) with a knowledge management tool, interfacing (650) with a calendar tool, collaboration tool or a combination of these, and interfacing (660) with a business intelligence tool.

In addition, the combining can involve checking (670) for query handlers (e.g., sub-classes) that fit in a framework (e.g., an abstract class) defining a translation service configured at runtime, and converting (680) with a query handler between a first language service of the SFA tool and a second language service of another of the application resources. Thus, a dynamic code base can be employed, where a core of the code stays the same, and dynamic libraries (which can be found at runtime) can be added as needed. New code can be dropped into the framework, where this new code identifies the data source it can handle, thus allowing the system to be grown without changing the existing code base.

The combining can further include connecting on-demand indexing supported by a CRM tool with background crawling and indexing supported by the knowledge management tool, such as described above. Moreover, the combining can include connecting on-demand indexing supported by a CRM tool with natural language queries supported by the knowledge management tool, such as described above. In any event, sales targeted information can be presented (690) from results obtained through the combining (610).

Embodiments of the present systems and techniques, and all of the functional operations described in this specification can be implemented in digital electronic circuitry, or in computer software, firmware, or hardware, including the structures disclosed in this specification and their structural equivalents, or in combinations of them. Embodiments of the present systems and techniques can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a machine-readable communication channel on which a signal is propagated. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the present systems and techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present systems and techniques can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the present systems and techniques, or any combination of such back-end, middleware, or front-end components. The components of the system can be interconnected by any form or medium of digital data communication, e.g., a communication network. Examples of communication networks include a local area network ("LAN"), a wide area network ("WAN") and a network of networks, e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the present systems and techniques have been described. Other embodiments are within the scope of the following claims. For example, the actions recited in the claims can be performed in a different order and still achieve desirable results. Also, although the reusable framework is described above in connection with databases and web services, the framework can also be used to communicate with other systems and technologies, such as communicating through sockets or to a legacy system.

Furthermore, the integration of the KM search server can be done using a Servlet or Java Servlet Page (JSP) with the search server's API for web applications instead of utilizing the CRM tool's search framework. An alternate approach to crawling the CRM tool's data can be to create a custom crawler to index the data. Although in practice, the approach of analyzing the data in the database, and then crawling and indexing based on the relationships in the data, can provide a simpler, reusable approach that is just as robust as the custom crawler approach.

The invention claimed is:

1. A computer system comprising:
   at least one processor; and
   at least one non-transitory computer-readable medium coupled to the at least one processor having stored thereon:
      a composite application that includes a framework for query handlers and that is configured to combine services from multiple application resources on a network;
   wherein the composite application includes instructions which, when executed by the at least one processor, causes the at least one processor to perform operations comprising:
      checking for query handlers that fit in the framework included in the composite application;

based on the checking, locating query handlers that fit in the framework included in the composite application, the located query handlers being configured to convert between a language service used by one of the multiple application resources and a different language service used by another of the multiple application resources;

incorporating, into the composite application at runtime, the located query handlers; and providing collaborative functionality between the multiple application resources on the network by enabling multiple independent application resources to communicate with one another through the located query handlers incorporated into the composite application at runtime and presenting results of the collaborative functionality.

2. The computer system of claim 1, wherein all of the multiple application resources are configured to communicate with the composite application and a subset of the multiple application resources communicate with one another to provide collaborative functionality.

3. The computer system of claim 1, wherein enabling multiple independent application resources to communicate with one another comprises enabling multiple independent application resources that otherwise would not be able to communicate with one another to communicate with one another.

4. The computer system of claim 1, wherein enabling multiple independent application resources to communicate with one another comprises enabling multiple independent application resources to exchange communications directly with one another through at least one of the located query handlers, the exchanged communications bypassing the composite application.

5. The computer system of claim 1, wherein at least one of the multiple independent application resources communicates with the composite application through a pathway that does not include any of the located query handlers.

6. The computer system of claim 1, wherein enabling multiple independent application resources to communicate with one another comprises:

receiving, at a query handler, a query from a first application resource included in the multiple independent application resources;

turning, by the query handler, the received query into a reformatted query that is formatted appropriately for a second application resource included in the multiple independent application resources, the second application resource being different than the first application resource;

providing, by the query handler, the reformatted query to the second application resource;

receiving, at the query handler and from the second application resource, a result of the reformatted query;

repackaging, by the query handler, the result of the reformatted query for return to the first application resource; and returning, by the query handler, the repackaged result of the reformatted query to the first application resource.

7. The computer system of claim 1, wherein the composite application is readily expandable by adding a new query handler to convert a language service of a newly added application resource.

8. The computer system of claim 1, wherein the composite application employs a dynamic code base by:

maintaining a core of the code of the dynamic code base the same;

finding, at runtime, dynamic libraries; and dropping, into the framework, new code from the dynamic libraries, wherein the new code identifies the data source it can handle.

9. The computer system of claim 1, wherein the multiple application resources comprise:

a sales force automation tool configured to automate sales and sales force management functions;

a real-time predictive analytics tool configured to evaluate customer purchasing data and recommend products or services based on the customer purchasing data;

a knowledge management tool configured to search and retrieve data across multiple integrated applications; and a calendar tool configured to manage appointment scheduling, and wherein enabling multiple independent application resources to communicate with one another through the located query handlers incorporated into the composite application at runtime comprises enabling the sales force automation tool, the real-time predictive analytics tool, the knowledge management tool, and the calendar tool to communicate with one another through the located query handlers incorporated into the composite application at runtime.

10. The computer system of claim 1, wherein the multiple application resources comprise:

a collaboration tool configured to resolve access rights restrictions and allow multiple users to access information in real time; and a business intelligence tool configured to gather and organize business information from multiple sources, including at least one live news feed, and wherein enabling multiple independent application resources to communicate with one another through the located query handlers incorporated into the composite application at runtime comprises enabling the collaboration tool and the business intelligence tool to communicate with one another through the located query handlers incorporated into the composite application at runtime.

11. A computer-implemented method comprising:

combining, using at least one processor executing instructions of a composite application that includes a framework for query handlers, services from multiple application resources on a network, the combining including:

checking for query handlers that fit in the framework included in the composite application;

based on the checking, locating query handlers that fit in the framework included in the composite application, the located query handlers being configured to convert between a language service used by one of the multiple application resources and a different language service used by another of the multiple application resources;

incorporating, into the composite application at runtime, the located query handlers; and providing collaborative functionality between the multiple application resources on the network by enabling multiple independent application resources to communicate with one another through the located query handlers incorporated into the composite application at runtime and presenting results of the collaborative functionality.

12. The method of claim 11, wherein all of the multiple application resources are configured to communicate with the composite application and a subset of the multiple application resources communicate with one another to provide collaborative functionality.

13. The method of claim 11, wherein enabling multiple independent application resources to communicate with one another comprises enabling multiple independent application resources that otherwise would not be able to communicate with one another to communicate with one another.

14. The method of claim 11, wherein enabling multiple independent application resources to communicate with one another comprises enabling multiple independent application resources to exchange communications directly with one another through at least one of the located query handlers, the exchanged communications bypassing the composite application.

15. The method of claim 11, wherein at least one of the multiple independent application resources communicates with the composite application through a pathway that does not include any of the located query handlers.

16. The method of claim 11, wherein enabling multiple independent application resources to communicate with one another comprises:

receiving, at a query handler, a query from a first application resource included in the multiple independent application resources;

turning, by the query handler, the received query into a reformatted query that is formatted appropriately for a second application resource included in the multiple independent application resources, the second application resource being different than the first application resource;

providing, by the query handler, the reformatted query to the second application resource;

receiving, at the query handler and from the second application resource, a result of the reformatted query;

repackaging, by the query handler, the result of the reformatted query for return to the first application resource; and returning, by the query handler, the repackaged result of the reformatted query to the first application resource.

17. The method of claim 11, wherein the composite application is readily expandable by adding a new query handler to convert a language service of a newly added application resource.

18. The method of claim 11, wherein the composite application employs a dynamic code base by:

maintaining a core of the code of the dynamic code base the same;

finding, at runtime, dynamic libraries; and dropping, into the framework, new code from the dynamic libraries, wherein the new code identifies the data source it can handle.

19. The method of claim 11, wherein the multiple application resources comprise:

a sales force automation tool configured to automate sales and sales force management functions;

a real-time predictive analytics tool configured to evaluate customer purchasing data and recommend products or services based on the customer purchasing data;

a knowledge management tool configured to search and retrieve data across multiple integrated applications; and a calendar tool configured to manage appointment scheduling, and wherein enabling multiple independent application resources to communicate with one another through the located query handlers incorporated into the composite application at runtime comprises enabling the sales force automation tool, the real-time predictive analytics tool, the knowledge management tool, and the calendar tool to communicate with one another through the located query handlers incorporated into the composite application at runtime.

20. The method of claim 11, wherein the multiple application resources comprise:

a collaboration tool configured to resolve access rights restrictions and allow multiple users to access information in real time; and a business intelligence tool configured to gather and organize business information from multiple sources, including at least one live news feed, and wherein enabling multiple independent application resources to communicate with one another through the located query handlers incorporated into the composite application at runtime comprises enabling the collaboration tool and the business intelligence tool to communicate with one another through the located query handlers incorporated into the composite application at runtime.

* * * * *